US012397488B2

(12) United States Patent
Okuyama (10) Patent No.: US 12,397,488 B2
(45) Date of Patent: Aug. 26, 2025

(54) APPARATUS FOR CONTROLLING FLUIDITY INDEX OF MOLTEN RESIN (71) Applicant: SHIBAURA MACHINE CO., LTD., Tokyo (JP)

(72) Inventor: Hiroshi Okuyama, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 413 days.

(21) Appl. No.: 17/772,563

(22) PCT Filed: Oct. 21, 2020

(86) PCT No.: PCT/JP2020/039491
§ 371 (c)(1),
(2) Date: Apr. 28, 2022

(87) PCT Pub. No.: WO2021/085256
PCT Pub. Date: May 6, 2021

(65) Prior Publication Data
US 2023/0302701 A1 Sep. 28, 2023

(30) Foreign Application Priority Data
Oct. 28, 2019 (JP) ................ 2019-195388

(51) Int. Cl.
B29C 45/77 (2006.01)
B29C 45/00 (2006.01)
(Continued)

(52) U.S. Cl.
CPC ...... B29C 45/7646 (2013.01); B29C 45/0001 (2013.01); B29C 45/47 (2013.01);
(Continued)

(58) Field of Classification Search
CPC ..... B29C 45/18; B29C 45/1808; B29C 45/54; B29C 45/76; B29C 45/7646; B29C 45/77
See application file for complete search history.

(56) References Cited

U.S. PATENT DOCUMENTS

| 4,325,255 A | 4/1982 | Howard et al. |
| 7,744,788 B2 * | 6/2010 | Portier ................ B29C 45/7646 425/169 |
| 2019/0283278 A1 * | 9/2019 | Clark ..................... B29C 48/43 |

FOREIGN PATENT DOCUMENTS

| DE | 112020002436 T | 2/2022 |
| JP | 54-135857 | 10/1979 |

(Continued)

OTHER PUBLICATIONS

German Office Action in Application No. 11 2020 005 189.7, dated Jan. 31, 2024.

(Continued)

Primary Examiner — Thu Khanh T. Nguyen
(74) Attorney, Agent, or Firm — DLA Piper LLP (US)

(57) ABSTRACT

There is provided a method for controlling a fluidity index of a molten resin, which can detect the fluidity of a molten resin even during successive molding operations and, in addition, can control the fluidity within a target range. The method includes: assuming that a narrow flow path, formed in a flow path for the molten resin, is a capillary or an orifice, and measuring, based on the amount of a metered molten resin and the back pressure applied to the screw during a metering step, a fluidity index which indicates the fluidity of the metered molten resin; and feeding back the measured fluidity index value and comparing it with a target value, and (Continued)

controlling the back pressure or the rotating speed of the screw so as to eliminate a deviation between the target value and the measured value.

3 Claims, 6 Drawing Sheets

(51) Int. Cl.
*B29C 45/47* (2006.01)
*B29C 45/74* (2006.01)
*B29C 45/76* (2006.01)
*B29K 105/00* (2006.01)

(52) U.S. Cl.
CPC .............. *B29C 45/74* (2013.01); *B29C 45/77* (2013.01); *B29K 2105/0058* (2013.01)

(56) References Cited

FOREIGN PATENT DOCUMENTS

| JP | H05-329864 | 12/1993 |
| JP | H11-10693 | 1/1999 |
| JP | H11-10694 | 1/1999 |
| JP | 2003-262579 | 9/2003 |
| JP | 2004-142204 | 5/2004 |
| JP | 2008-044110 | 2/2008 |
| JP | 2020-189421 | 11/2020 |

OTHER PUBLICATIONS

International Preliminary Report On Patentability in PCT/JP2020/039491, dated Apr. 28, 2022.
Written Opinion in PCT/JP2020/039491, dated Dec. 22, 2020.
International Search Report in PCT/JP2020/039491, dated Dec. 22, 2020.
English Language Abstract of JP H05-329864 published Dec. 14, 1993.
English Language Abstract of JP H11-10693 published Jan. 19, 1999.
English Language Abstract of JP H11-10694 published Jan. 19, 1999.
English Language Abstract of JP 2003-3252579 published Sep. 19, 2003.
English Language Abstract of JP 2004-142204 published May 20, 2004.
English Language Abstract of JP 2008-044110 published Feb. 28, 2008.
English Language Abstract of JP 2020-0189421 published Nov. 26, 2020.

* cited by examiner

APPARATUS FOR CONTROLLING FLUIDITY INDEX OF MOLTEN RESIN

CROSS REFERENCE TO RELATED APPLICATIONS

This application is a U.S. National Stage Application of International Application No. PCT/JP2020/039491 filed Oct. 21, 2020, which claims priority from Japanese Patent Application No. 2019-195388 filed Oct. 28, 2019. The entirety of all the above-listed applications are incorporated herein by reference.

TECHNICAL FIELD

The present invention relates to a method for controlling a fluidity index of a molten resin.

BACKGROUND ART

In an injection molding machine, a resin as a molding material, fed into a heating barrel, is plasticized by rotating a screw. The molten resin is conveyed to an area in front of the screw and metered there while moving the screw backward. In an injection step, the screw is moved forward to fill the molten resin into a mold.

How to handle a flowing molten resin is of essential significance in injection molding. Therefore, in order to obtain a high-quality molded product, it is important to detect and assess the fluidity of a molten resin. The fluidity of a molten resin is generally expressed in terms of the viscosity.

To measure the viscosity of a molten resin in a heating barrel is difficult as compared to the measurement of the temperature or the pressure; therefore, the measurement of the viscosity has often not been performed. However, these days there are improved techniques for measuring the viscosity of a molten resin.

For example, patent document 1 describes a technique which involves injecting a molten resin when a nozzle is not in touch with a mold in a step different from a molding step, and calculating the viscosity of the molten resin from the injection pressure.

Patent document 2 describes a technique which involves determining the pressure of a molten resin and the flow rate of the resin in a resin flow path in every injection operation to calculate the viscosity of the resin. This technique enables real-time online measurement of the viscosity of the molten resin during molding.

Patent document 3 describes a technique which involves measuring the pressure of a molten resin at the front end of a nozzle in an injecting step, and calculating the viscosity of the molten resin based on the pressure.

CITATION LIST

Patent Literature

Patent document 1: Japanese Patent Laid-Open Publication No. 2004-142204
Patent document 2: Japanese Patent Laid-Open Publication No. H5-329864
Patent document 3: Japanese Patent Laid-Open Publication No. H11-10693

SUMMARY OF THE INVENTION

Problems to be Solved by the Invention

The method disclosed in patent document 1, which involves purging a molten resin from the nozzle when it is separated from the mold in order to measure the viscosity of the molten resin in a step different from a molding step, has the following problem: The purging operation needs to be repeated a plurality of times in order to obtain a reliable viscosity value, resulting in disposal of a large amount of the resin. In the case of determining the viscosity of a molten resin in an injection step as described in patent documents 2 and 3, the viscosity of the molten resin cannot be determined unless it is injected into a mold In addition, the fluidity of a resin cannot be detected during successive molding operations. In order to solve this problem, the applicant has proposed a method for measuring a fluidity index of a molten resin (Japanese Patent Application No. 2019-95406).

On the other hand, the properties of a resin material, which is provided in the form of pellets by a manufacturer, may vary among different production lots. Thus, the fluidity of a molten resin may vary among different lots of the same product and, for some reason, the variation can be considerably large.

The present invention has been made in view of the above problems in the prior art. It is therefore an object of the present invention to provide a method and an apparatus for controlling a fluidity index of a molten resin, which can detect the fluidity of a molten resin even during successive molding operations and, in addition, can control the fluidity within a target range.

Means for Solving the Problems

In order to achieve the object, the present invention, in one embodiment, provides a method for controlling a fluidity index of a molten resin in an injection molding machine which injects the molten resin in a heating barrel from a nozzle into a mold by means of a screw moving forward in the heating barrel, the method comprising: assuming that a narrow flow path, formed in a flow path for the molten resin, is a capillary or an orifice, and measuring, based on the amount of a metered molten resin and the back pressure applied to the screw during a metering step, a fluidity index which indicates the fluidity of the metered molten resin; and feeding back the measured fluidity index value and comparing it with a target value, and controlling the back pressure or the rotating speed of the screw so as to eliminate a deviation between the target value and the measured value.

BEST MODE FOR CARRYING OUT THE INVENTION

Embodiments of a molten resin fluidity index control method according to the present invention will now be described with reference to the attached drawings.

First Embodiment

Figure 1:
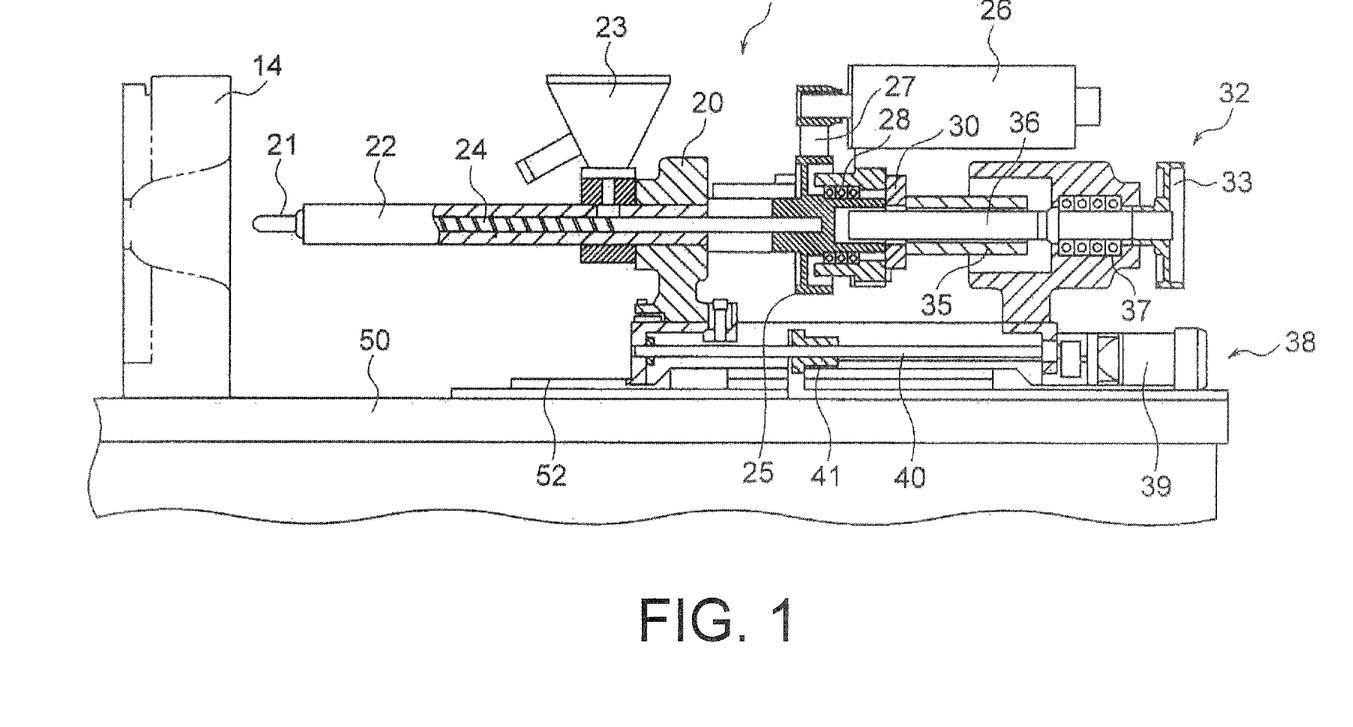
FIG. 1 is a cross-sectional view of an injection apparatus of an injection molding machine for performing a molten resin fluidity index control method according to an embodiment of the present invention.

FIG. 1 is a cross-sectional view of an injection apparatus of an injection molding machine for performing a molten resin fluidity index control method according to an embodiment.

In FIG. 1, reference numeral 10 denotes an injection apparatus provided on a base 50. The injection apparatus 10 is installed on the base 50 movably along a rail 52. A fixed die plate 14 of a mold clamping apparatus is provided in front of the injection apparatus 10. The injection apparatus 10 includes a heating barrel 22 supported horizontally by a frame 20, and a screw 24 provided within the heating barrel 22. A nozzle 21, which is to be connected to a mold, is provided at the front end of the heating barrel 22. A hopper 23, into which resin pellets as a molding material are to be fed, is provided on the base-end side of the heating barrel 22.

The screw 24 is slidably and rotatably housed in the heating barrel 22. The base end of the screw 24 is coupled to a pulley 25 of a rotary drive mechanism. The rotary drive mechanism is configured to transmit the rotation of a screw rotating motor 26 to the pulley 25 via a transmission belt 27. A load cell 30 is provided behind a bearing 28 that supports the pulley 25. The load cell 30 is a load measuring device for measuring an axial load applied to the screw 24.

The screw 24 is configured to axially move back and forth in the heating barrel 22 by means of a back-and-forth movement mechanism 32. The back-and-forth movement mechanism 32 includes a pulley 33, to which the rotation of a not-shown back-and-forth movement motor is transmitted via a belt, a nut portion 35, a ball screw 36, a bearing 37 that supports the ball screw 36, etc.

Referring to FIG. 1, a thrust mechanism 38, which moves the entire injection apparatus 10 back and forth, is provided on the base 50. The thrust mechanism 38 includes a thrust motor 39, and a ball screw mechanism composed of a ball screw 40 and a nut 41.

Figures 2, 3:
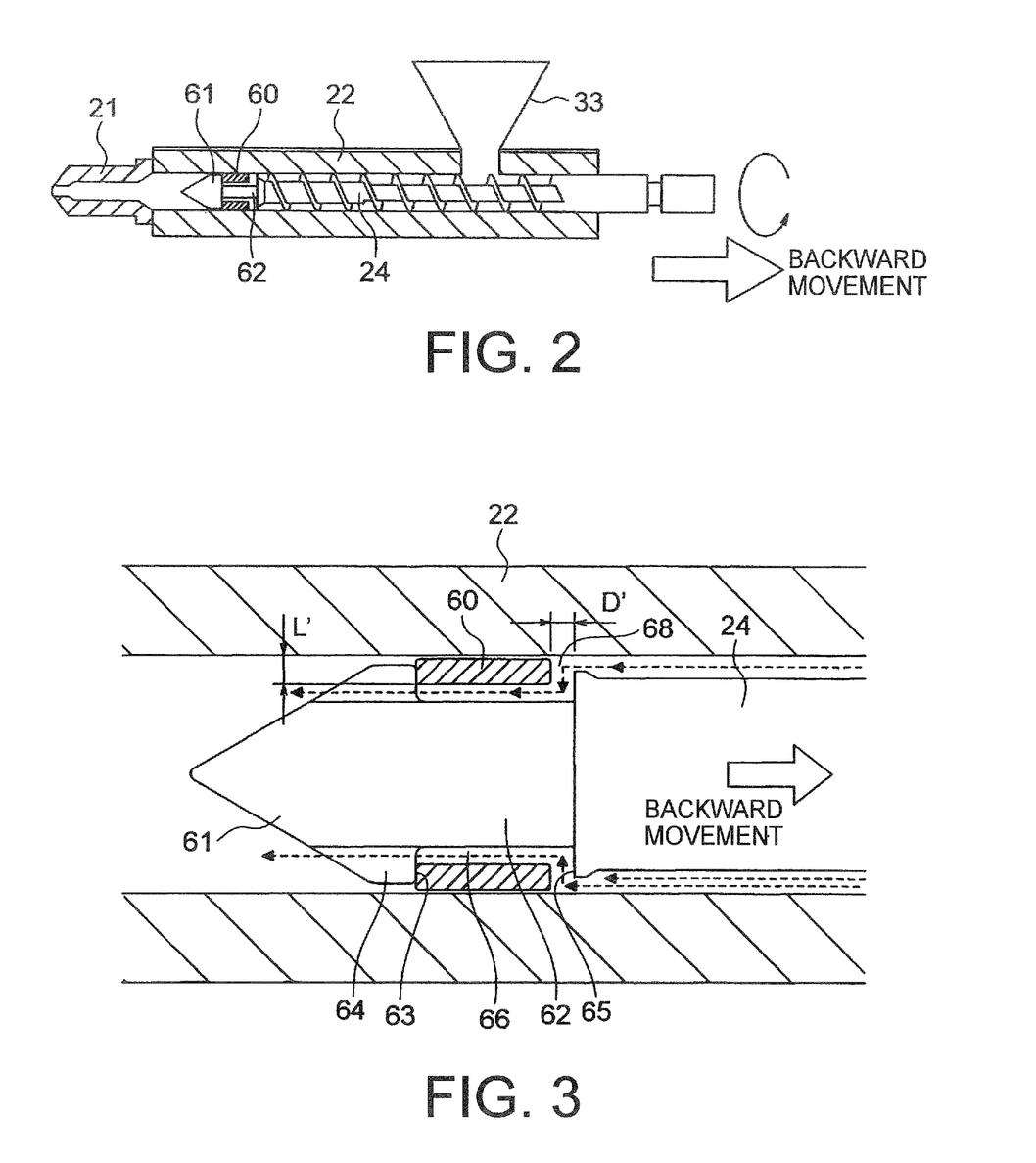
FIG. 2 is a vertical cross-sectional view of a heating barrel.
FIG. 3 is a cross-sectional view showing a non-return check ring provided at the front end of a screw.

FIG. 2 shows a vertical cross-sectional view of the heating barrel 22, and FIG. 3 shows a non-return check ring 60 provided at the front end of the screw 24.

As shown in FIGS. 2 and 3, a screw tip 61 is mounted to the front end of the screw 24. The screw tip 61 is secured to the front end of the screw 24 via a small-diameter shaft 62. The screw tip 61 has a conical shape. A first flow path 64, in which a molten resin flows, is formed between the peripheral surface of the screw tip 61 and the inner peripheral surface of the heating barrel 22. The check ring 60 is axially movably mounted on the small-diameter shaft 62.

The check ring 60 is disposed between the rear end surface 63 of the screw tip 61 and a seat 65 provided at the front end of the screw 24. A second flow path 66, in which a molten resin flows and which communicates with the first flow path 64, is formed between the inner peripheral surface of the check ring 60 and the peripheral surface of the small-diameter shaft 62. FIG. 3 shows the position of the check ring 60 during a metering step. While the screw 24 is rotating to covey a molten resin forward, the screw 24 moves backward when the molten resin is metered.

The flow of a molten resin upon its metering is shown by the dotted arrows in FIG. 3. As the screw 24 moves backward upon metering of the resin, the check ring 60 relatively moves toward the screw tip 61 and away from the seat 65. The molten resin flows from a narrow flow path 68 into the second flow path 66, and flows through the first flow path 64 and is collected in front of the screw tip 61.

When injecting the molten resin, the rear end surface of the check ring 60 is pressed against the seat 65, whereby the narrow flow path 68 is closed; therefore, backward flow of the molten resin is prevented.

In the molten resin fluidity index control method of this embodiment, a fluidity index of a molten resin is calculated using the narrow flow path 68, which is formed behind the check ring 60 during a metering step, and the second flow path 66. Before describing the index control method, the capillary rheometer method, which is a common fluid viscosity test method, will be described with reference to FIG. 4.

Figure 4:
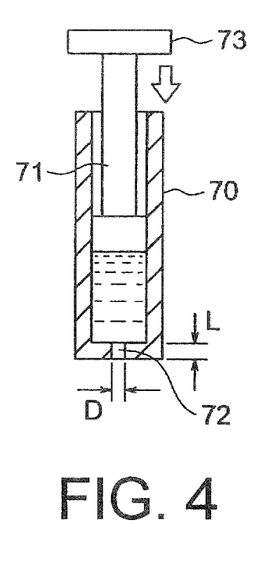
FIG. 4 is a schematic view of a cylinder for use in the capillary rheometer method.

FIG. 4 is a schematic view of a cylinder for use in the capillary rheometer method.

In FIG. 4, 70 denotes a cylinder, and 71 denotes a piston that fits into the cylinder 70. A capillary 72 is provided at the front end of the cylinder 70.

The capillary rheometer method comprises forcing a molten resin in the cylinder 70 out of the capillary 72 with the piston 71 moving at a constant speed, measuring the load applied to the moving piston 71 with a load cell 73, and calculating the viscosity of the fluid using the following formulae (1) to (4). The viscosity is finally calculated by the formula (4).

$$Q = Av \quad (1)$$

$$\gamma = 32Q/\pi D^3 \quad (2)$$

$$\tau = pD/4L \quad (3)$$

$$\eta = \tau/\gamma \quad (4)$$

where Q: flow rate of molten resin (mm$^3$/s)
A: cross-sectional area of piston (mm$^2$)
v: speed of piston (mm/s)
γ: apparent shear rate (s$^{-1}$)
D: diameter of capillary (mm)
τ: apparent shear stress (Pa)
p: piston load (Pa)
L: length of capillary (mm)
η: melt viscosity (Pa·s)

Assume that referring to FIG. 4, the fluid whose viscosity is to be measured is a molten resin. The situation where the molten resin is forced out by the piston 71 in the method shown in FIG. 4 is similar to the situation where a molten resin is metered while the screw 24 moves backward in the metering step illustrated in FIG. 3.

In the capillary rheometer method, the molten resin is forced out through the capillary 72, which is a narrowed flow path, by pressure from the piston 71. In the metering step, the molten resin is forced out through the narrow flow path 68 by pressure from the screw 24. Thus, the two methods have a commonality in that a resin is forced out of a narrow flow path by applying pressure to the resin.

Though there are differences in shape and size between the piston 71 and the screw 24 and between the capillary 72 and the narrow flow path 68, the two methods are conceptually the same in the use of a narrowed flow path, which is essential for the measurement of the fluidity of a molten resin. In this embodiment, the narrow flow path 68 is assumed to be equivalent to the capillary 72.

In the metering step illustrated in FIG. 3, the width D' of the narrow flow path 68 formed at the front end of the screw 24 is assumed to be equivalent to the diameter D of the capillary 72 of the cylinder 70 of FIG. 4. The radial length L' of the narrow flow path 68, i.e. the thickness of the check ring 60, is assumed to be equivalent to the length L of the capillary 72.

The "flow rate of molten resin" corresponds to the amount of the metered resin per unit time. In this embodiment, the backward movement speed of the screw 24 is detected and, based on the backward movement distance per unit time of the screw 24, the diameter of the screw 24, the inner diameter of the heating barrel 22, etc., the volume between the screw 24 and the heating barrel 22 is calculated to determine the amount of the metered resin per unit time.

The back pressure applied to the screw 24 can be detected by the load cell 30.

In the metering step, the backward movement speed of the screw 24 is controlled such that the back pressure is kept constant. The backward movement speed is not constant in a strict sense; an average speed throughout the metering step or the average of several measured speeds may be taken as the backward movement speed.

Such assumed correspondence relationships necessitate a modification of the formulae (2) and (3); an appropriate change of the coefficient may be made in advance. A value obtained from the modified formula (4) is not an absolute viscosity value strictly in accordance with the capillary rheometer method; however, the value obtained is practically sufficient as an index used to relatively assess the fluidity of a molten resin.

Figure 5:
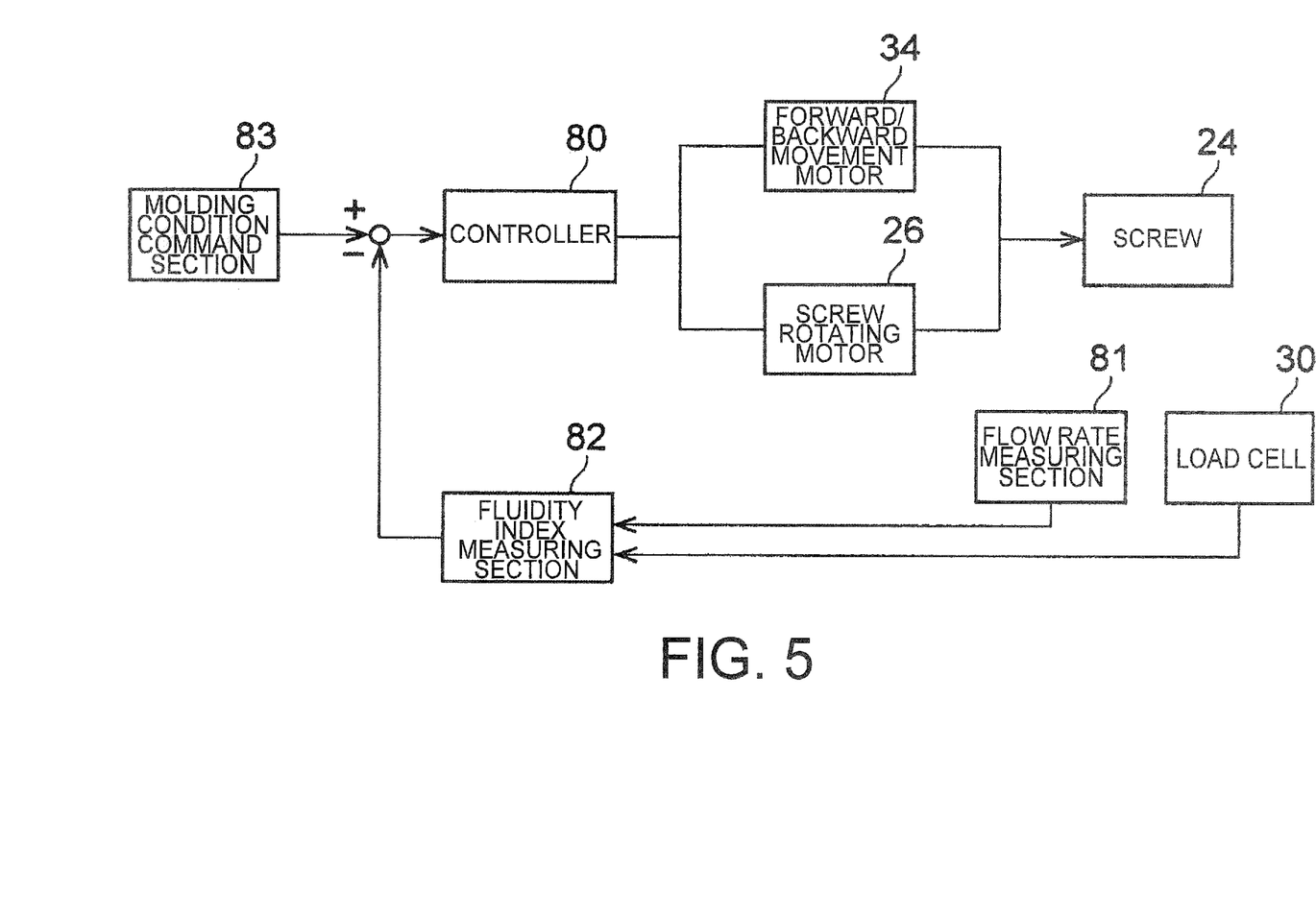
FIG. 5 is a control block diagram of a molten resin fluidity index control apparatus.

FIG. 5 is a control block diagram of a molten resin fluidity index control apparatus. In FIG. 5, reference numeral 80 denotes a controller. The control target is a fluidity index (as determined by the capillary rheometer method or the melt flow rate method) of a molten resin metered in the injection apparatus 10. The fluidity index is affected by the back pressure applied to the screw 24 during metering of the molten resin and the rotating speed of the screw 24. In this embodiment, the back pressure and/or the rotating speed of the screw 24 is the manipulating variable. The back pressure can be controlled by controlling, with the controller 80, a forward/backward movement motor 34 for moving the screw 24 back and forth. The rotating speed of the screw 24 can be controlled by controlling the screw rotating motor 26 with the controller 80.

The fluidity index of a molten resin can be measured with a fluidity index measuring section 82 by the above-described measuring method based on measurement values from a flow rate measuring section 81 for measuring the amount of a metered resin based on the backward movement speed of the screw 24, and from the load cell 30 for detecting a back pressure applied to the screw 24. The measured fluidity index is fed back to the control system and compared to a target command value from a molding condition command section 83. The controller 80 then controls the back pressure or the rotating speed of the screw 24 so as to eliminate a deviation between the target command value and a detection value.

The operation of the above-described fluidity index control apparatus will now be described in relation to successive molding operations of the injection molding machine.

As used herein, "successive molding operations" refer to a repetition of a molding cycle, including the steps of mold closing, mold clamping, metering, injection, pressure holding, mold opening, and molded product removal, performed in a successive manner over a long period of time while the nozzle of the injection apparatus is kept in touch with a mold. However, the nozzle 21 may sometimes move backward, e.g. on completion of cooling, during one cycle.

In the metering step of each molding cycle, the amount of a metered resin is measured based on the backward movement speed of the screw 24 and, in addition, the back pressure applied to the screw 24 is detected. This enables the fluidity index measuring section 82 to measure a fluidity index value by the above-described quasi-capillary rheometer method. Therefore, it becomes possible to assess, based on the measured index value, the fluidity properties of a metered molten resin online during successive molding operations.

In a metering step during successive molding operations, a target value has been set for a fluidity index of a molten resin. In particular, molding is performed in advance using a real machine, and a desirable value for a molded product is set as the target value.

However, in actual successive molding operations, an error from the target value is produced in a fluidity index value of a molten resin due to different lots, different moisture contents, different compositions, etc. of the raw material resin.

In view of this, in this embodiment feedback control is performed so that the measured fluidity index value of a molten resin becomes equal to the target value.

Figure 6:
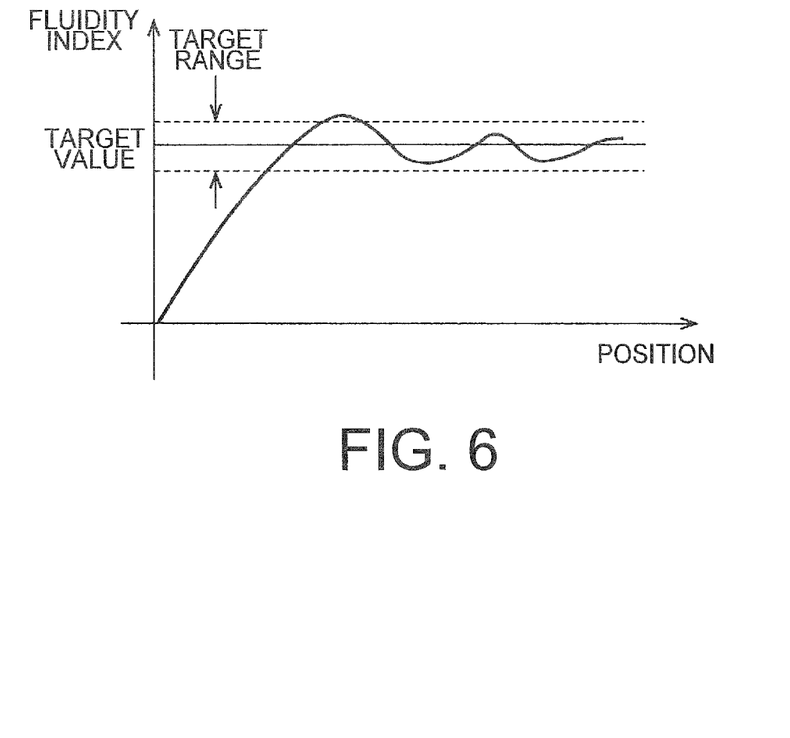
FIG. 6 is a graph showing change in a fluidity index during a metering step according to a first embodiment.

FIG. 6 is a graph showing an example of change in a fluidity index during a metering step. The abscissa axis represents the position of the screw 24 during a metering step, and the ordinate axis represents the fluidity index of a molten resin. The higher the fluidity index value, the higher the viscosity of the molten resin. A target range with a fluidity index target value as a median is defined by an upper limit value and a lower limit value each differing by a predetermined value from the median.

In the initial stage of a metering step, due to a response delay, the measured fluidity index value gradually approaches the target value. There may be a compositional variation between lots of the raw material resin. Due to the variation, the measured fluidity index value can exceed the upper limit of the target fluidity index range. The measured value that has been fed back is compared to the target value, and the back pressure applied to the screw 24 is adjusted so as to eliminate a deviation between the target value and the measured value. Consequently, the fluidity index value returns to the target range. While the fluidity index then makes a repetitive change in a vibrating manner, the fluidity index value is generally held within the target range. In this manner, the fluidity index of a molten resin is maintained within the intended target range in a metering step during successive molding operations. This enables stable molding of good products by successive molding operations.

Second Embodiment

In the first embodiment described above, a fluidity index of a molten resin in a metering step is controlled using one target value as a reference. In a second embodiment, on the other hand, a fluidity index is controlled using different target values set for a plurality of regions of a metered resin in the heating barrel 22.

Figure 7:
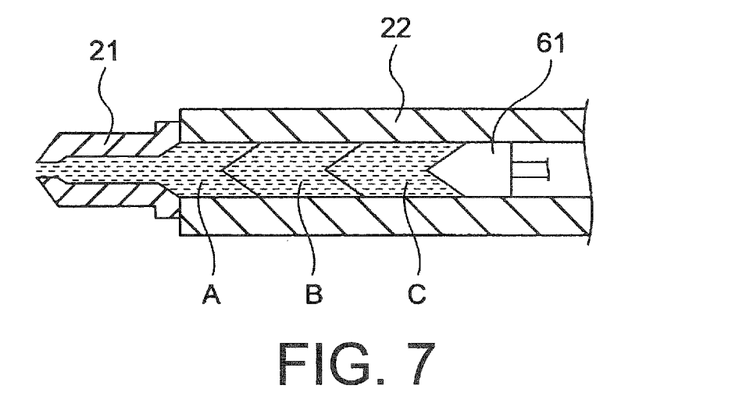
FIG. 7 is a diagram showing a metered resin collected in front of a screw in a metering step according to a second embodiment.

FIG. 7 is a diagram showing a metered resin collected in front of the screw 24.

In this embodiment, the metered resin is divided, for example, into three regions A, B and C for which different fluidity index target values are set. The frond end-side region A has a low target value, the rear end-side region C has a high target value, and the middle region B has an intermediate target value.

Figure 8:
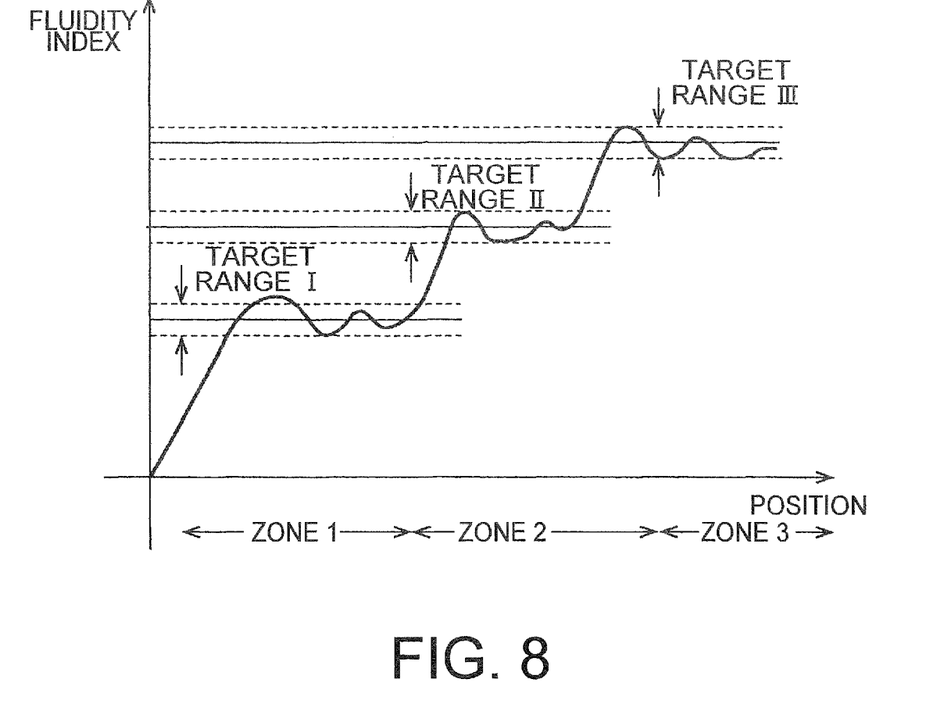
FIG. 8 is a diagram showing change in a fluidity index during a metering step according to the second embodiment.

FIG. 8 is a diagram showing change in a fluidity index during a metering step according to the second embodiment. Different fluidity index target values are set for zones 1 to 3, and target ranges I to III, each defined by its upper and lower limit values, are set for the zones 1 to 3. The zones 1 to 3 correspond to the regions A to C.

While the screw 24 is moving through the zone 1, a measured fluidity index value that has been fed back is compared to the target value, and the back pressure applied to the screw 24 is adjusted so as to eliminate a deviation between the target value and a measured value, whereby the fluidity index is maintained within the target range I. Similarly, feedback control of the fluidity index is performed for each of the zones 2 and 3, so that the fluidity index is maintained within the target range II or III.

According to the second embodiment described above, it becomes possible to meter a molten resin, whose fluidity properties differ between the regions A, B and C, as shown in FIG. 7, and inject the resin into a mold. This makes it possible to feed a portion of a molten resin, having particular fluidity properties, to a particular area of a cavity in the mold for which the particular fluidity properties are suited, thereby enabling the production of a molded product with enhanced quality.

(Variation) While a fluidity index is calculated according to the quasi-capillary rheometer method in the above-described embodiment, it is also possible to measure a fluidity index by a quasi-MFR (melt flow rate) method during metering of a molten resin, assuming that the narrow flow path 68 is an orifice.

Referring to FIG. 4, the melt flow rate method is performed by applying a predetermined load to the piston 71 to force a fluid out of the capillary (orifice) 72, and measuring the weight of the ejected fluid per 10 minutes (g/10 min).

The metering step is performed under control so that a constant back pressure is continually applied to the screw 24; therefore, the amount of a metered resin per 10 minutes is to be calculated. The amount of a metered resin per 10 minutes can be calculated from the amount of the metered resin per unit time, determined in the above-described embodiment.

As with the measurement of a fluidity index by the quasi-capillary rheometer method and the feedback of the measured value, performed in the above-described embodiments, the measurement of a fluidity index by the quasi-MFR method and the feedback of the measured value makes it possible to control the fluidity index within a target range.

In the above-described embodiments, the present invention is applied to injection molding using a thermoplastic resin as a molding material. The present invention can also be applied to injection molding using a thermosetting resin, etc. An injection apparatus for a thermosetting resin, etc. cannot use any check ring at the front end of a screw. In the injection apparatus, a thermosetting resin flows through a narrow path separated by a flight and formed on the peripheral surface of the screw. Therefore, as in the case of a thermoplastic resin, it is possible to calculate a fluidity index in a metering step.

While the back pressure of the screw is used as a manipulating variable for controlling a fluidity index in the above-described embodiments, it is also possible to use the rotating speed of the screw or a combination of the back pressure of the screw with the rotating speed of the screw or with the heating temperature of a barrel heater.

While preferred embodiments of the molten resin fluidity index control method according to the present invention have been described, these embodiments have been presented by way of example only, and are not intended to limit the scope of the present invention. Indeed, the novel apparatus, method and system described herein may be embodied in a variety of other forms; furthermore, various omissions, substitutions and changes may be made to the embodiments described above without departing from the spirit of the present invention. The accompanying claims and their equivalents are intended to cover such forms or modifications as would fall within the scope and spirit of the present invention.

The invention claimed is:

1. A method for controlling a fluidity index of a molten resin in an injection molding machine which injects the molten resin in a heating barrel from a nozzle into a mold by a screw moving forward in the heating barrel, the method comprising:

setting a respective target value for a fluidity index of the molten resin for each of a plurality of regions of a metered molten resin in the heating barrel, the plurality of regions including a first region on a front end side of the heating barrel, a second region in a middle of the heating barrel, and a third region on a rear end side of the heating barrel, wherein the respective target value of the third region is greater than the respective target value of the second region, and the respective target value of the second region is greater than the respective target value of the first region;

assuming that a narrow flow path, formed in a flow path for the molten resin, is a capillary or an orifice;

measuring an amount of the metered molten resin;

measuring a back pressure applied to the screw during a metering step, wherein the narrow flow path is formed between a non-return check ring and a seat provided at the front end of the screw when the check ring is positioned away from the seat during the metering step;

calculating, based on the measured amount of the metered molten resin and the measured back pressure, a fluidity index which indicates the fluidity of the metered molten resin; and feeding back the calculated fluidity index value and comparing it with the respective target value in each of the regions during the metering step, and controlling the back pressure or the rotating speed of the screw so as to eliminate a deviation between at least one respective target value and the calculated value.

2. The molten resin fluidity index control method according to claim 1, wherein the fluidity index of the molten resin is measured by a quasi-capillary rheometer method, assuming that the narrow flow path is a capillary.

3. The molten resin fluidity index control method according to claim 1, wherein the fluidity index of the molten resin is measured by a quasi-melt flow rate method, assuming that the narrow flow path is an orifice.

* * * * *